(12) United States Patent
Gopisetty et al.

(10) Patent No.: US 8,838,779 B2
(45) Date of Patent: Sep. 16, 2014

(54) MULTI-LEVEL OFFLOAD OF MODEL-BASED ADAPTIVE MONITORING FOR SYSTEMS MANAGEMENT

(75) Inventors: Sandeep Gopisetty, Morgan Hill, CA (US); Stefan Jaquet, Morgan Hill, CA (US); Sandeep Madhav Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 12/612,507

(22) Filed: Nov. 4, 2009

(65) Prior Publication Data

US 2011/0106938 A1     May 5, 2011

(51) Int. Cl.
*G06F 15/173* (2006.01)
*G06F 11/34* (2006.01)

(52) U.S. Cl.
CPC ........ *G06F 11/3495* (2013.01); *G06F 2201/81* (2013.01); *G06F 11/3447* (2013.01); *G06F 11/3409* (2013.01)
USPC .......................................... 709/224; 370/255

(58) Field of Classification Search
USPC .......................................... 709/224; 370/255
See application file for complete search history.

(56) References Cited

U.S. PATENT DOCUMENTS

| | | | |
|---|---|---|---|
| 5,993,038 A * | 11/1999 | Sitbon et al. | 709/202 |
| 6,137,782 A * | 10/2000 | Sharon et al. | 370/255 |
| 6,754,705 B2 | 6/2004 | Joiner et al. | |
| 6,801,936 B1 | 10/2004 | Diwan | |
| 6,985,941 B2 | 1/2006 | Schweitzer et al. | |
| 7,111,059 B1 | 9/2006 | Garcea et al. | |
| 7,177,267 B2 | 2/2007 | Oliver et al. | |
| 7,197,520 B1 * | 3/2007 | Matthews et al. | 1/1 |
| 7,281,041 B2 | 10/2007 | Daggett | |
| 8,051,160 B2 * | 11/2011 | Crayford et al. | 709/223 |
| 2004/0210418 A1 * | 10/2004 | Fukuda et al. | 702/182 |
| 2005/0204028 A1 * | 9/2005 | Bahl et al. | 709/223 |
| 2006/0095561 A1 | 5/2006 | Childress et al. | |
| 2006/0187017 A1 * | 8/2006 | Kulesz et al. | 340/506 |
| 2007/0038738 A1 | 2/2007 | Iyengar | |
| 2007/0222585 A1 * | 9/2007 | Sabol et al. | 340/539.11 |

\* cited by examiner

*Primary Examiner* — Thomas Dailey
(74) *Attorney, Agent, or Firm* — Lieberman & Brandsdorfer, LLC

(57) ABSTRACT

A method, system, and article are provided for monitoring performance of hardware devices. Each hardware device is configured with an agent, and the server is configured with a coordinator. The agent collects device data at a first modifiable frequency and communicates the collected data to the coordinator at a second dynamically modifiable frequency. The collected data is periodically monitored and the first and second frequencies are modified subject to evaluation of the collected and monitored data.

15 Claims, 5 Drawing Sheets

MULTI-LEVEL OFFLOAD OF MODEL-BASED ADAPTIVE MONITORING FOR SYSTEMS MANAGEMENT

BACKGROUND OF THE INVENTION

1. Technical Field

This invention relates to monitoring operation performance of hardware devices in a computer system. More specifically, the invention relates to adaptively monitoring and modifying the frequency upon which data is gathered from hardware devices in order to accumulate the most useful information for hardware performance determination.

2. Description of the Related Art

Systems management is the general area of information technology that concerns configuring and managing computer resources, including network resources. This includes gathering requirements, purchasing equipment and software, distributing it to where it is to be used, configuring it, maintaining it with enhancement and service updates, setting up problem-handling processes, and determining whether objectives are being met. In one embodiment, network management and database management are viewed as part of systems management or as co-equal parts of a total information system.

Monitoring operation and performance of devices in the computer system is an important aspect of the systems management. In general, the goal of monitoring performance is to ensure that the devices are properly performing. Modern wide area network computer systems consist of a vast plurality of interconnected devices, including host computer systems, network switches, storage devices, etc. Administering such computer systems is complex and generally requires managing each of the hardware devices in the network. Typical metrics that are monitored for the hardware devices include health status, device performance, device configuration, capacity data, etc.

FIG. 1 is a block diagram (100) of a computer system that employs a data collector to gather device performance data. More specifically, multiple data providers (102), (104), (106), and (108) are shown in communication with a data collector (120). The data providers (102)-(108) communicate performance data to the data collector (120), which is stored in data storage (130). Communication can be either via a push model in which the data providers (102)-(108) send data to the data collector (120) at a particular frequency, or via a pull model in which the data collector (120) polls the data providers (102)-(108) for data at a particular frequency. Regardless of the communication mechanism, the data collector (120) obtains data from the data providers (102)-(108) at a preset static frequency and stores the data persistently in the data storage (130).

Data collectors, such as that described in FIG. 1, do not efficiently gather data from the devices in the system. For example, the typical architecture for monitoring hardware devices in the system gathers data at predefined static frequencies. Static thresholds cannot detect all abnormalities in the system. If the frequency is set too high to ensure that data is gathered at a sufficient granularity, this places strain on the data providers and the data storage. In addition, this places a strain on a coordinator employed to evaluate the gathered data as there will be an abundant quantity of data for evaluation. Conversely, if the frequency is set too low to avoid the performance strains of a high frequency, there is an increased chance that a problem may go undetected for a prolonged period. Additionally, the coordinator may not be able to properly diagnose a problem in the system as there may not be a sufficient amount of gathered device data for such an evaluation. Accordingly, to fully exploit efficient management of disparate hardware devices in the system is challenging.

Accordingly, there is a need to employ a systems management application that supports dynamically changing the frequency in which data is communicated from the hardware devices to the data collector(s). Each hardware device should be monitored and evaluated based upon its performance and capabilities. Such a dynamical application supports efficient evaluation of heterogeneous hardware devices, thereby improving overall systems management.

SUMMARY OF THE INVENTION

This invention comprises a method, system, and article for efficiently monitoring and managing a set of heterogeneous computer hardware devices.

In one aspect of the invention, a method is provided for monitoring two or more hardware devices. Each hardware device subject to monitoring is configured with an agent. Data pertaining to the hardware device is collected by its agent at a first set frequency. The collected data is then communicated to a device monitor at a second set frequency. For each hardware device, expected retrieval data is set and associated with the hardware device. The collected data is then compared with the expected retrieval data for the subject device against a threshold value, which is created using a regression-based performance model of the device. The second set frequency is dynamically modified for the agent communicating the collected data to the device monitor in response to a comparison of the collected data with the threshold value being either greater than the threshold or less than the threshold.

In another aspect of the invention, a computer system is provided with a server, having a processor unit in communication with memory, and two or more hardware devices in communication with the server. Each hardware device is configured with a local agent. A coordinator is provided local to the server and is in communication with each local agent of each configured hardware device. Each local agent collects data about the hardware device at a first frequency, and communicates the collected data to the coordinator at a second frequency. For each hardware device, the coordinator compares the collected data with an expected retrieval data against a threshold value, which is created through use of a regression-based performance model of the hardware device. A coordinator manager is provided in communication with the coordinator and each local agent. The coordinator manager dynamically modifies the second frequency for the agent in response to comparison data that is greater than the threshold or less than the threshold.

In yet another aspect of the invention, an article is provided with a computer-readable carrier including computer program instructions configured to monitor two or more hardware devices. The computer readable carrier includes computer program instructions configured to manage collection and evaluation of device data. Instructions are provided to configure each hardware device with an agent, for each agent to collect data about the hardware device at a first set frequency, and to communicate the collected data to a device monitor at a second set frequency. For each hardware device, instructions are provided to associate a set expected retrieval data for the subject device. Instructions are also provided to compare the collected data with the expected retrieval data for the subject device against a threshold value, created using a regression-based performance model of the device. A dynamic modification of the second set frequency is conducted in response to a comparison of the collected data with the threshold value being greater than the threshold or less than the threshold.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

Figure 1:
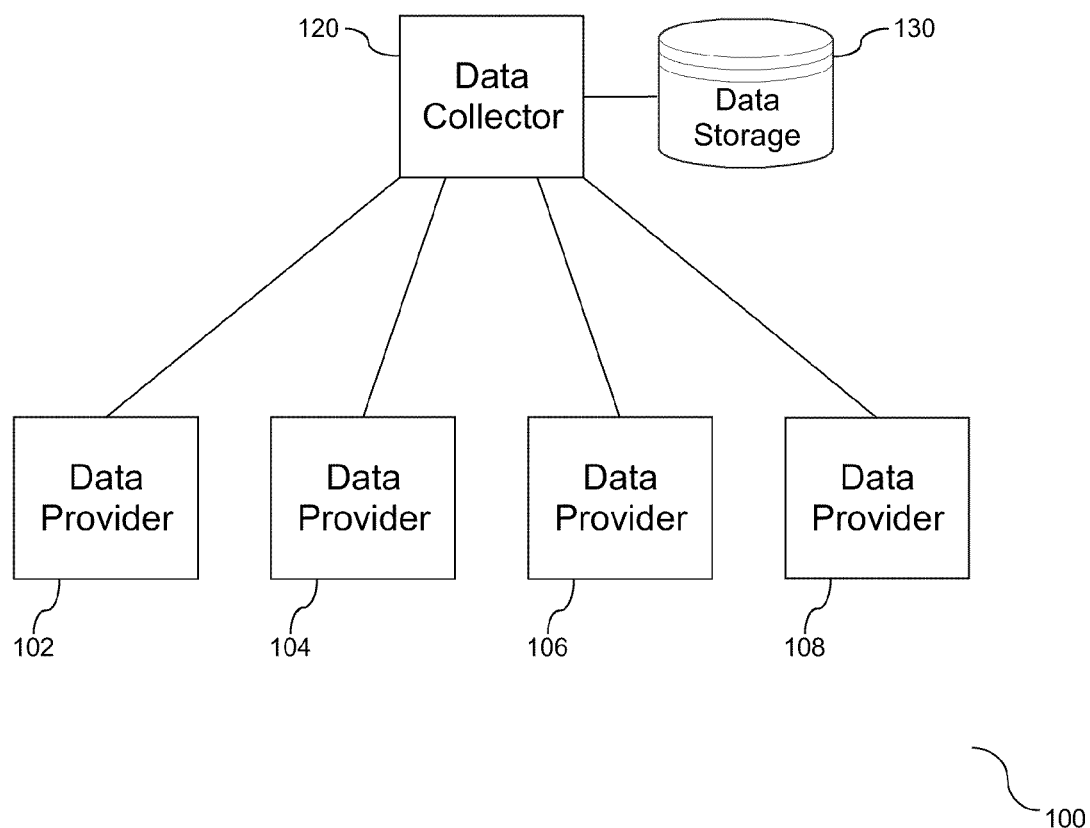
FIG. 1 is a block diagram of a prior art computer system for gathering device performance data.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as agents, coordinators, and managers. Each functional unit may be implemented in programmable hardware devices such as field programmable gate arrays, programmable array logic, programmable logic devices, or the like. The functional unit(s) may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of an agent, a coordinator, and a coordinator manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the spirit and scope of the present invention.

Figure 2:
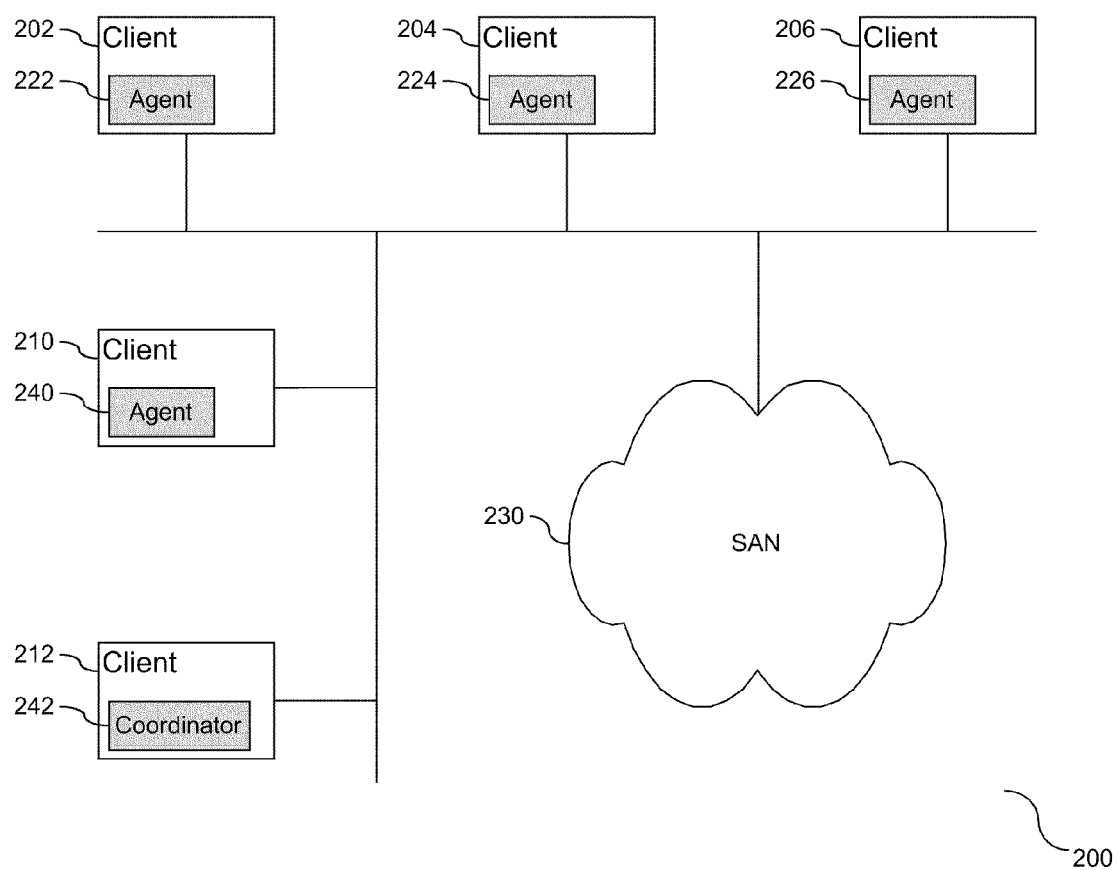
FIG. 2 is a block diagram of an adaptive system for gathering device performance data according to the preferred embodiment of this invention, and is suggested for printing on the first page of the issued patent.

FIG. 2 is a block diagram (200) of an adaptive system for monitoring performance of hardware devices. As shown, there is a distributed computer network with client machines (202), (204), and (206), servers (210), and (212), and a storage area network (230). Although there are only a limited quantity of client machines and servers shown herein, the invention should not be limited to this quantity. In one embodiment, the system may be configured with a larger or smaller quantity of client machines and servers. An agent is shown local to each client machine. More specifically, client machine (202) is provided with agent (222), client machine (204) is provided with agent (224), and client machine (206) is provided with agent (226). Similarly, server (210) is provided with agent (240). Each agent (222), (224), (226), and (240) retrieves device data from its associated hardware device at a retrieval frequency (RF). More specifically, each agent gathers and collects data about performance of the hardware device it is assigned to monitor. Based upon the illustration shown herein, agent (222) collects hardware data from client machine (202), agent (224) collects hardware data from client machine (204), agent (226) collects hardware data from client machine (206), and agent (240) collects hardware data from server (210).

There are two servers shown in the network, server (210) and server (212). A coordinator (242) is provided local to the server (212), and is responsible for receiving data from each of the agents (222), (224), (226) and (240), with the data relating to operation and performance of the associated hardware device. More specifically, each agent gathers data from its hardware device at one frequency. The gathered data is sent from each agent to the coordinator (242) at a second frequency. In one embodiment, the frequency at which each agent gathers data is different then the frequency at which the gathered data is communicated to the agent, both of which may be dynamically established frequencies. The data received by the coordinator (242) is stored in persistent data at a third frequency. Each of the frequencies for communicating data is an adaptive frequency that is monitored and dynamically modifiable based upon evaluation of the collected data. Accordingly, each of the agents is separately monitored and modified based upon evaluation of the data associated with that device.

Figure 3:
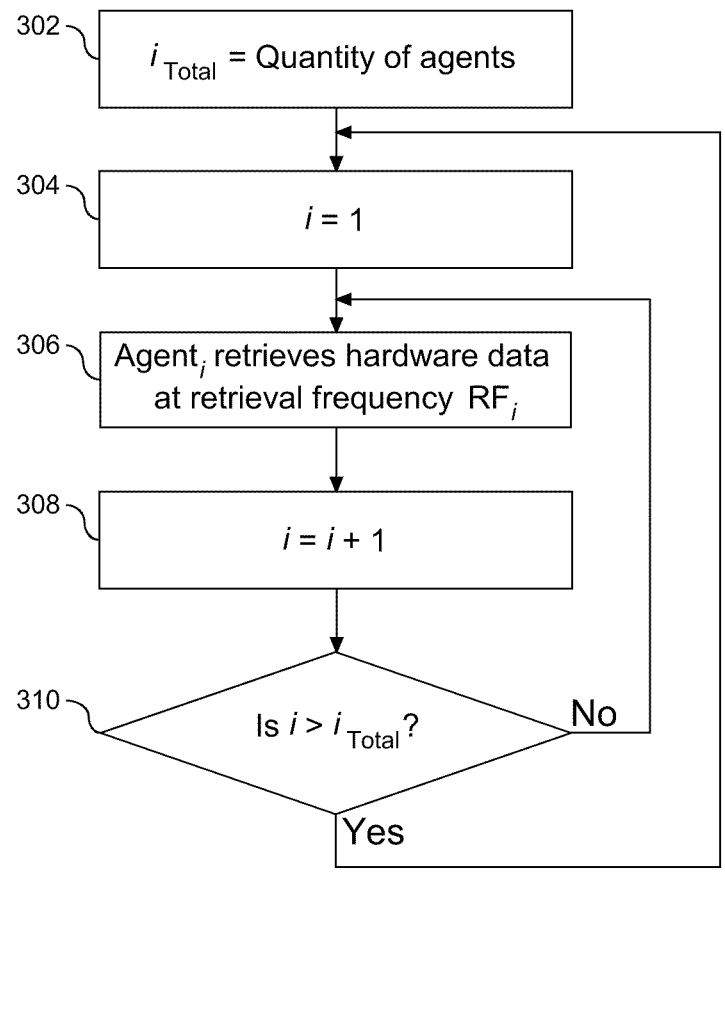
FIG. 3 is a flow chart illustrating a process for each agent to retrieve data from its respective hardware device.

FIG. 3 is a flow chart (300) illustrating a process for modifying the frequency in which data is communicated from an individual agent to the coordinator. Initially, the quantity of agents in the system is gathered and assigned to the variable $i_{Total}$ (302). In one embodiment, each hardware device in the system has its own agent. Following step (302), a counting variable, i, is set to the integer one (304). For each Agent, hardware data is retrieved from the device the agent is monitoring at the retrieval frequency, $RF_i$, (306). In one embodiment, the retrieval frequency is dynamically modifiable. Part of the device configuration process may include establishing an initial retrieval frequency, which may be later modified based upon the evaluation demonstrated below in FIG. 4. Following step (306), the counting variable i, is incremented (308), and it is then determined if all of the retrieval frequency data for each hardware device has been identified (310). A negative response to the determination at step (310) is followed by a return to step (306). Conversely, a positive response to the determination at step (310) is followed by a return to step (304). Accordingly, the first part of the hardware device data evaluation process includes each agent retrieving data from its hardware device at the set retrieval frequency.

Figure 4:
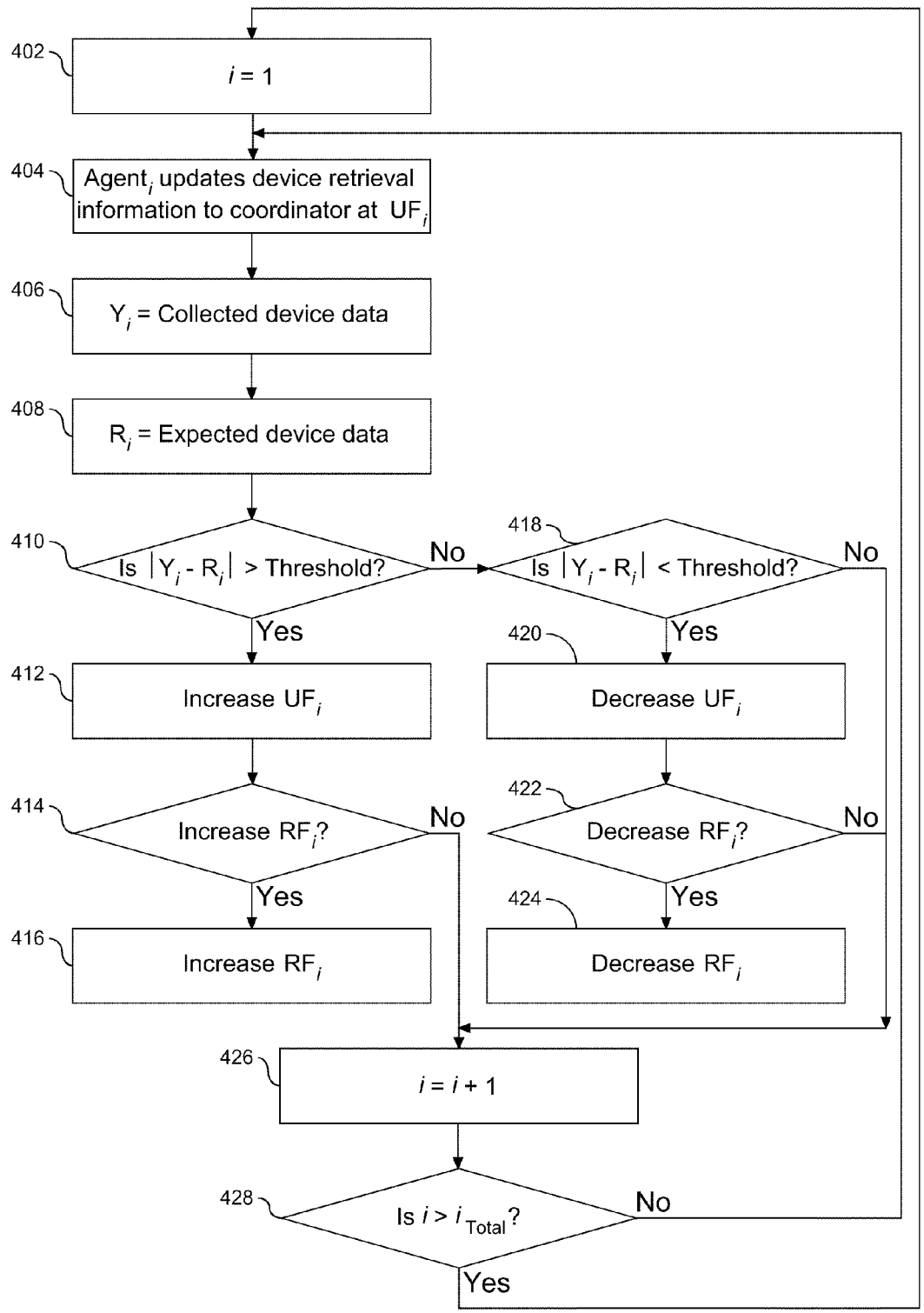
FIG. 4 is a flow chart illustrating a process for modifying the frequency at which the agent communicates data to the coordinator.

Each agent communicates hardware device data to a coordinator at a set frequency. In one embodiment, each hardware device is configured with its own dynamically modifiable frequency for communicating hardware device data to the coordinator. FIG. 4 is a flow chart (400) illustrating analysis of the hardware device data received by the coordinator. Initially, the counting variable, i, is set to the integer one (402). Each agent, $Agent_i$, updates the device data retrieved from the associated hardware device being monitored to a coordinator at an established frequency for the subject hardware device (404). In one embodiment, the frequency at step (404) is known as an update frequency, UF. The update frequency, UF, is the rate at which the coordinator is updated with device data from each respective agent. The update frequency is a dynamic frequency that may be modified based upon the operating region of the specific hardware device. As illustrated, the device has actual data that is based upon the operation of the device and the collected data, $Y_i$, (406). At the same time, there is a general expectation of how the device should be operating, $R_i$, (408). This general operation expectation is based upon the innate characteristics of the device itself. A comparison is performed for the collected device data and the expected device data (410) in relation to a threshold value. In one embodiment, the threshold value is created through a regression based performance model for the hardware device. Similarly, in one embodiment, the threshold value is computed by a threshold function, device model function, or a mathematical averaging model based on collected data.

If the comparison at step (410) yields a result greater than a threshold value, the update frequency, $UF_i$, is increased (412). Following step (412), it is then determined if the retrieval frequency, $RF_i$ should be increased (414). A positive response to the determination at step (414) is followed by an increase of the retrieval frequency for the subject hardware device (416). Conversely, a negative response to the determination at steps (414) or (410) is followed by a subsequent comparison to determine if the comparison yields a result less than the threshold value (418). A positive response to the determination at step (418) is followed by a decrease of the update frequency, $UF_i$ (420). Following step (420), it is then determined if the retrieval frequency, $RF_i$, should be decreased (422). A positive response to the determination at step (422) is followed by a decrease of the retrieval frequency for the subject hardware device (424). Conversely, a negative response to the determination at step (422) concludes that the device update does not require a change at this time. Following a negative response to the determinations at steps (414), (418), or (422), the counting variable, i, is incremented (426), and it is determined if all of the hardware devices have been subject to evaluation (428). A negative response to the determination at step (428) is followed by a return to step (402). Conversely, a positive response to the determination at step (428) is followed by a return to step (404) to continue the evaluation process of the retrieval frequency, RF, for each hardware device in the system. Accordingly, the process of adjusting the update frequency, UF, and retrieval frequency, RF, for each device is continuous in nature and accounts for both the collected device data and the expected device data.

Figure 5:
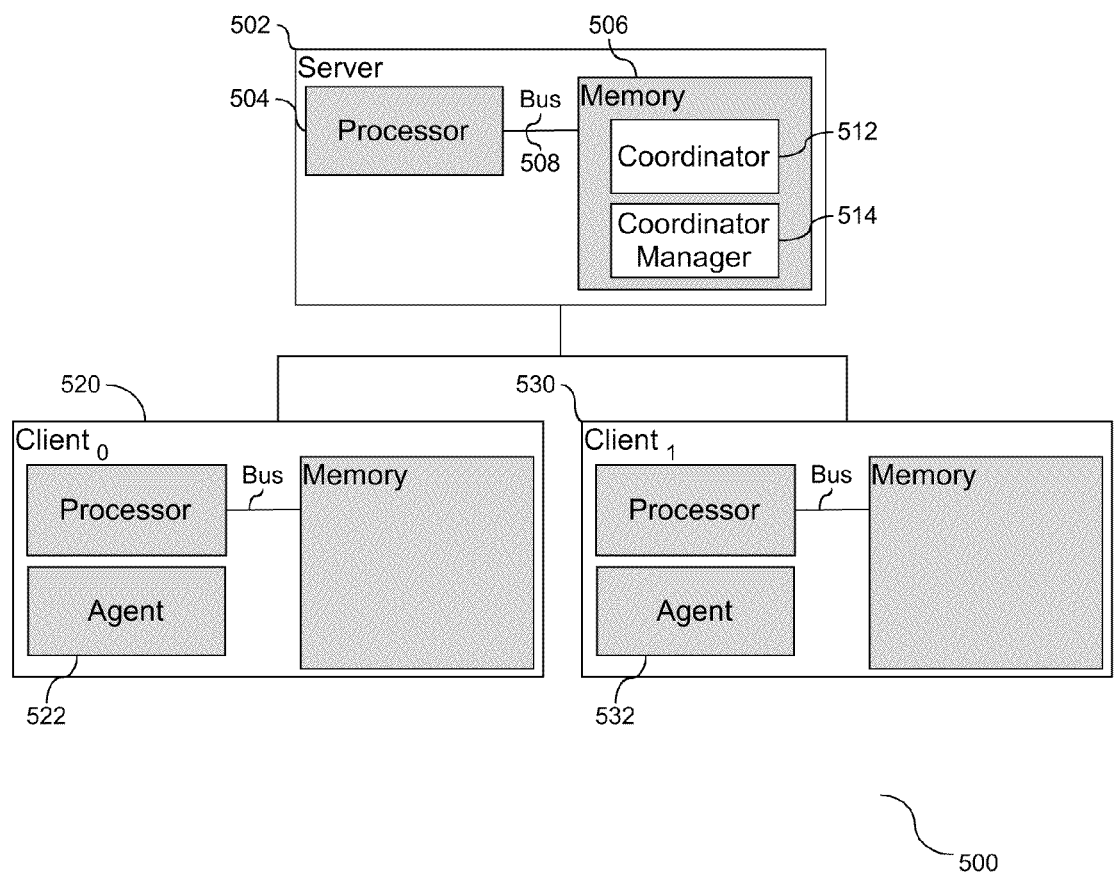
FIG. 5 is a block diagram illustrating placement of the functional units in the different hardware elements in the computer system.

To further illustrate the invention, FIG. 5 is a block diagram of a computer system (500) having a server to manage two or more hardware devices. A server (502) is provided in the system with a processor unit (504) in communication with memory (506) across a bus (508). Although only one processor unit is shown herein, the invention should not be limited to a single processor unit. In one embodiment, the server (502) may be configured with multiple processor units. Two hardware devices (520) and (530) in the form of client machines are shown in communication with the server (502). Each hardware device is provided with a local agent. More specifically, hardware device (520) is provided with local agent (522), and hardware device (530) is provided with local agent (532). As shown herein, the hardware devices are client machines. However, in one embodiment, the hardware devices may be any manageable hardware device in the network, and should not be limited to a client machine. Each local agent collects data about its hardware device at a set frequency. More specifically, local agent (522) collects data about hardware device (520) at a first frequency, and local agent (532) collects data about hardware device (530) at a second frequency. In one embodiment, the first and second frequencies are dynamic frequencies that are subject to being modified. Accordingly, each local agent periodically collects data about the operation of the local hardware device at a dynamically modifiable frequency.

A coordinator (512) is provided local to the server (502) for communication with the hardware devices (520) and (530). More specifically, the coordinator (512) collates the collected device data and compares the collected data with an expected retrieval data against a threshold value. In one embodiment, the threshold value is created through use of a regression-based performance model of the hardware device. Similarly, in one embodiment, an alternative model may be employed to create the threshold value. A coordinator manager (514) is provided in communication with the coordinator and to modify the second frequency, as deemed necessary. The specifically, the coordinator manager (514) dynamically modifies the second frequency when the comparison data is greater than the threshold or less than the threshold. Accordingly, the coordinator manager (514) is provided to support dynamic modification of the second frequency value.

In one embodiment, in addition to the coordinator manager (514), an agent manager (not shown) may be provided local to or in communication with each hardware device. The agent manager is provided to modify the first frequency responsive to modification of the second set frequency. The first frequency modification may include a decrease of the first frequency responsive to a decrease of the second frequency, or an increase of the first frequency responsive to an increase of the second frequency. Accordingly, the agent manager is provided to support dynamic modified of the first frequency value.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages of the Exemplary Embodiment over the Related Art

Each hardware device in the network is adaptively monitored to selectively filter data from the agent of the respective device. The agent gathers data pertaining to performance of the hardware device. The monitoring framework propagates the filtered data to the coordinator for retention on a persistent storage device. The frequency at which the agent gathers data and the frequency at which the coordinator collects the gathered data are both dynamically and separately modifiable frequencies. Accordingly, hardware device data gathering is performed in a dynamic and transparent manner for each monitored device in the network.

Alternative Embodiments

It will be appreciated that, although specific embodiments of the invention have been described herein for purposes of illustration, various modifications may be made without departing from the spirit and scope of the invention. In particular, the hardware devices to be monitored are not limited to client machines and servers in a network. The data being captured and monitored is data pertaining to any manageable hardware device in the network, including but not limited to, switches, routers, etc. Accordingly, the scope of protection of this invention is limited only by the following claims and their equivalents.

We claim:

1. A method for monitoring two or more hardware devices, comprising:
    configuring each hardware device with an agent; the agent collecting data about the hardware device at a first set frequency, and communicating the collected data to a device monitor at a second set frequency;
    for each hardware device, associating a set expected retrieval data for the subject device; comparing the collected data with the expected retrieval data for the subject device against a threshold value created using a regression-based performance model of the device;
    dynamically modifying the second set frequency for the agent communicating the collected data to the device monitor in response to a comparison of the collected data with the threshold value, the comparison selected from the group consisting of: greater than the threshold, and less than the threshold;
    modifying the first frequency responsive to modifying the second set frequency, the first frequency modification including decreasing the first frequency responsive to a decrease of the second frequency, and increasing the first frequency responsive to an increase of the second frequency; and
    storing the data communicated to the device monitor at a third frequency, the third frequency being dynamically adjustable.

2. The method of claim 1, further comprising maintaining the second set frequency when the comparison is equal to the set threshold.

3. The method of claim 1, further comprising increasing the second set frequency responsive to the comparison exceeding the threshold value.

4. The method of claim 1, further comprising decreasing the second set frequency responsive to the comparison failing to meet the threshold value.

5. The method of claim 1, wherein the step of communicating the retrieved data to the device monitor is in response to a command selected from the group consisting of: a push command and a pull command.

6. A computer system comprising:
    a server comprising a processor unit in communication with memory;
    two or more hardware devices in communication with the server, each hardware device configured with a local agent;

a coordinator local to the server and in communication with each local agent;

the local agent to collect data about the hardware device at a first frequency, and to communicate the collected data to the coordinator at a second frequency;

for each hardware device, the coordinator to compare the collected data with an expected retrieval data against a threshold value created through use of a regression-based performance model of the hardware device;

a coordinator manager in communication with the coordinator and each local agent, the coordinator manager to dynamically modify the second frequency for the agent in response to comparison data selected from the group consisting of: greater than the threshold, and less than the threshold;

an agent manager to modify the first frequency responsive to modification of the second set frequency, the first frequency modification including a decrease of the first frequency responsive to a decrease of the second frequency, and an increase of the first frequency responsive to an increase of the second frequency; and the coordinator manager to store the data communicated to the coordinator at a third frequency, the third frequency being dynamically adjustable.

7. The system of claim 6, further comprising the coordinator manager to maintain the second set frequency when the comparison is equal to the set threshold.

8. The system of claim 6, further comprising the coordinator manager to increase the second set frequency responsive to the comparison exceeding the threshold value.

9. The system of claim 6, further comprising the coordinator manager to decrease the second set frequency responsive to the comparison failing to meet the threshold value.

10. The system of claim 6, wherein communicating of the retrieved data to the coordinator is in response to a command selected from the group consisting of: a push command and a pull command.

11. An article configured to monitor two or more hardware devices, the article comprising:

a computer readable data storage device including computer program instructions configured to manager collection and evaluation of device data, the instructions comprising:

instructions to configure each hardware device with an agent;

instructions for each agent to collect data about the hardware device at a first set frequency and to communicate the collected data to a device monitor at a second set frequency;

for each hardware device, instructions to associate a set expected retrieval data for the subject device;

instructions to compare the collected data with the expected retrieval data for the subject device against a threshold value created using a regression-based performance model of the device;

instructions to dynamically modify the second set frequency for the agent communicating the collected data to the device monitor in response to a comparison of the collected data with the threshold value, the comparison selected from the group consisting of: greater than the threshold, and less than the threshold;

instructions to modify the first frequency responsive to modification of the second set frequency, the first frequency modification including a decrease of the first frequency responsive to a decrease of the second frequency, and an increase of the first frequency responsive to an increase of the second frequency; and instructions to store the data communicated to the device monitor at a third frequency, the third frequency being dynamically adjustable.

12. The article of claim 11, further comprising instructions to maintain the second set frequency when the comparison is equal to the set threshold.

13. The article of claim 11, further comprising instructions to increase the second set frequency responsive to the comparison exceeding the threshold value.

14. The article of claim 11, further comprising instructions to decrease the second set frequency responsive to the comparison failing to meet the threshold value.

15. The article of claim 11, wherein the instructions to communicate the retrieved data to the device monitor is in response to a command selected from the group consisting of: a push command and a pull command.

* * * * *